United States Patent [19]

Bon

[11] Patent Number: 4,596,163
[45] Date of Patent: Jun. 24, 1986

[54] CYCLE PEDALS

[76] Inventor: Raymond Bon, 4, Sente des Favrils, 78570 Andresy, France

[21] Appl. No.: 589,234

[22] Filed: Mar. 14, 1984

[30] Foreign Application Priority Data

Mar. 22, 1983 [FR] France ................................ 83 04629

[51] Int. Cl.$^4$ .............................................. G05G 1/14
[52] U.S. Cl. .................................. 74/594.6; 74/594.4; 36/131
[58] Field of Search ................ 74/594.4, 594.5, 594.6; 36/131

[56] References Cited

U.S. PATENT DOCUMENTS

| 608,620 | 8/1898 | Nelson . | |
|---|---|---|---|
| 630,463 | 8/1899 | Matthews | 74/594.4 |
| 1,393,256 | 10/1921 | Wright | 74/594.5 |

FOREIGN PATENT DOCUMENTS

| 2450 | 10/1900 | Austria | 74/594.6 |
|---|---|---|---|
| 29581 | 4/1925 | France . | |
| 833569 | 10/1938 | France | 74/544.4 |
| 941771 | 1/1949 | France . | |
| 2500404 | 8/1982 | France . | |
| 2519602 | 7/1983 | France . | |
| 1685 | of 1893 | United Kingdom | 36/131 |
| 7118 | of 1895 | United Kingdom | 74/594.4 |
| 1586136 | 3/1981 | United Kingdom | 74/594.6 |

Primary Examiner—Kenneth J. Dorner
Attorney, Agent, or Firm—Brumbaugh, Graves, Donohue & Raymond

[57] ABSTRACT

Cycle pedals, for cycles in which the pedal axle is mounted inside a bearing, are equipped with means of adjustably fixing the bearing on the platform, and include means for fastening a pedal-stop provided under the sole of the cyclist's shoe. The bearing is mounted on the upper face of the platform, in such a way that two lugs provided on the pedal-stop are engaged one on each side of the bearing, and the plate of the pedal-stop is in contact with the bearing and is held in its center, which constitutes a rest point for the cyclist's foot. The platform has a front edge, which is turned up perpendicularly to its surface, against which rests the front edge of the pedal-stop.

8 Claims, 15 Drawing Figures

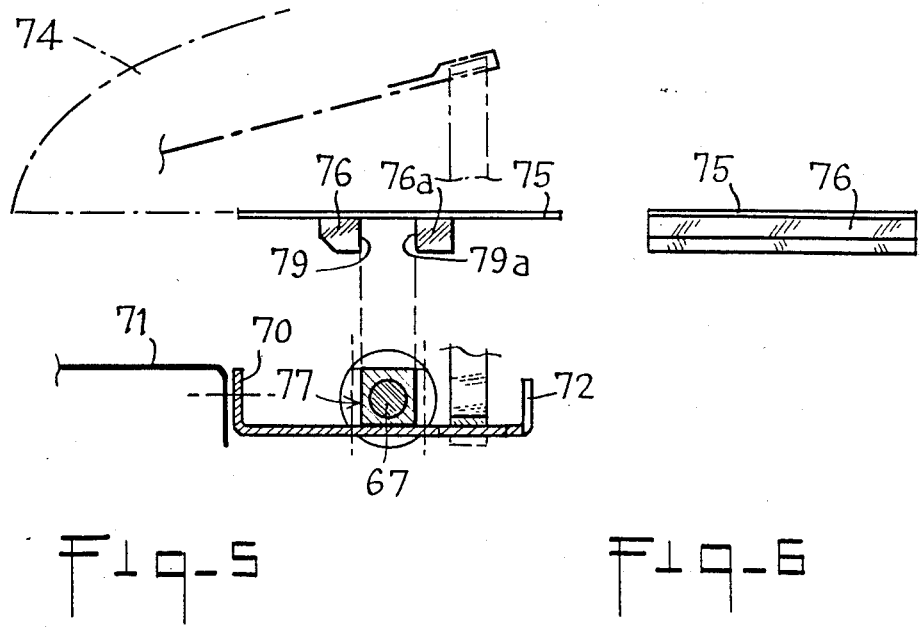
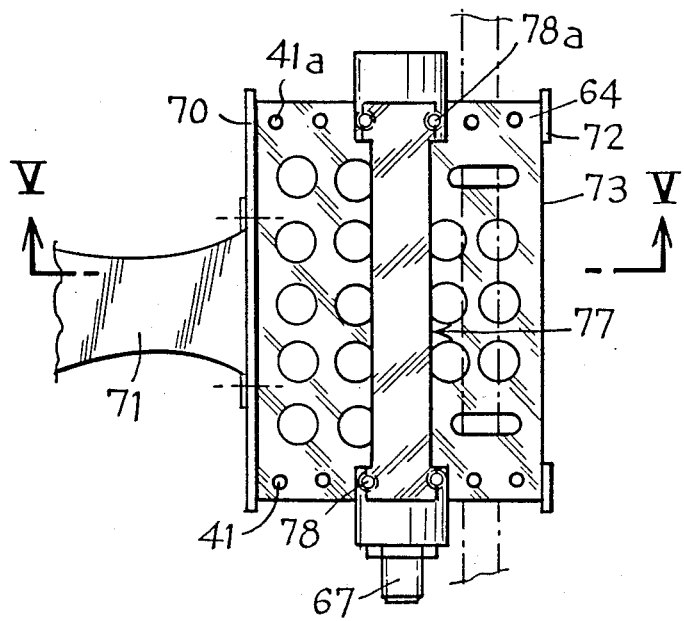

CYCLE PEDALS

The present invention relates to an improvement to cycle pedals.

French Pat. No. 81 03501 relates to a cycle pedal comprising means of adjusting the position of the rest point of the cyclist's foot on the pedal whose supporting surface is extended frontwards of the pivoting axle mounted on a crank-gear; said pedal comprises a first platform mounted for pivoting on an axle integral with the crank-gear, and a second platform mounted in adjustable manner on said first platform at the front of the crank-axle. The main object of this particular design is to bring the rest point of the cyclist's foot on the pedal axle and even at the front of said axle, thus using the action of the crank to the full.

First Addition No. 82 00232 to the aforementioned French patent relates to a device in which the axis of the pedal is mounted in a bearing equipped with fastening means for a pedal-stop secured under the sole of the cyclist's shoe.

It is now the object of the present invention to further improve the position of the cyclist's foot, by mounting the bearing on the upper face of the platform so that the two lugs provided on the pedal-stop are engaged, one on each side of the bearing.

According to this novel disposition, the foot rests on the pedal axle and even slightly at the front thereof, whilst all support is eliminated at the back of said pedal, so as to obtain a well-balanced support of the foot, permitting to develop all the muscular force of the cyclist. The improved device according to the invention further permits to lower the pedal cage considerably, and as a result, the saddle and handle-bars being also lowered, a considerable increase of the aerodynamism of the cycle is obtained. Finally, the special disposition of the pedal platform with respect to the pivoting axle gives a balanced assembly and a pedal which can remain in the horizontal position whatever the position of the crank-gear.

According to another characteristic of the invention, the pedal-stop comprises a plate equipped with two lugs engaged on either side of the bearing and resting on the platform of the pedal according to a plane $XX_1$ traversing the center of the pedal axle.

With the device according to the invention, the platform of the pedal is situated under the pivoting axle, and the main rest is on the axle and in the center thereof, and no longer at the back of the cage as in a conventional pedal. In this way, a perfect convergence is obtained between the position of the foot and the main rest. This advantage is obtained by advancing the pedal stop of about 30 mm, without changing the foot's position. Since the main support is obtained in a plane which contains the pedal axle, the result is a circular rotation of the cyclist's foot.

The invention will be more readily understood on reading the following description with reference to the accompanyig drawings, in which:

FIG. 4 is a plan view of a pedal with a bearing fixed directly on the platform;

FIG. 5 is an elevational view of a cross-section along line V—V of FIG. 4;

FIG. 6 is an elevational front view of the pedal-stop;

Figures 2, 3:
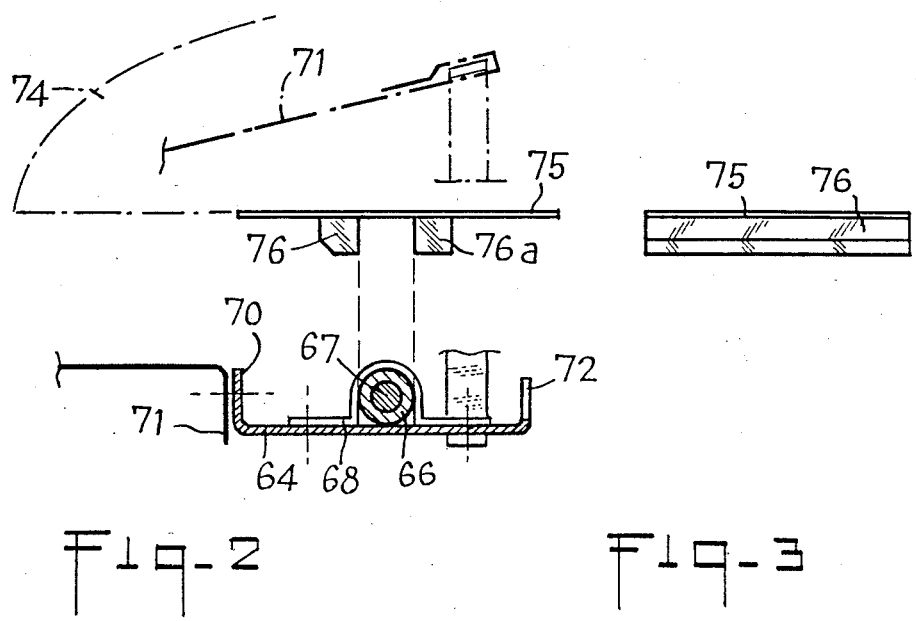
FIG. 2 is an elevational view of a cross-section along line II—II of FIG. 1.
FIG. 3 is an elevational front view of the pedal-stop.
Figure 1:
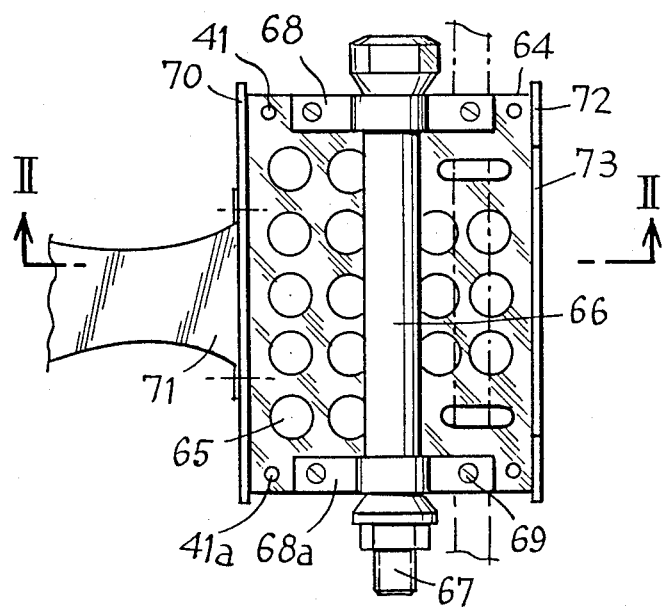
FIG. 1 is a plan view of a pedal with a bearing fixed on the platform by clamping means.

Referring first to FIGS. 1 and 2, these show a pedal comprising a platform 64 optionally perforated with holes 65 to make the pedal lighter, and on the upper face of which is fixed a bearing 66 in which is pivotally mounted a pedal axle 67, secured at the end of a cycle crank-gear, not shown in the drawing. Bearing 66 is mounted so as to be adjustable lengthwise on the platform by way of metal strips 68, 68a, secured by screws 69 engaged in two sets of holes provided on each side of platform 64. At the back and front of said platform, are provided edges 70 and 72 turned upwardly, perpendicularly to said platform, the front edge 70 constituting a support for a toe-clip 71, whereas the rear edge 72 is provided in its center with an indentation 73 to receive the sole of the cyclist's shoe which must not bear on the back of the pedal but in the center and in the front as specified hereinabove. Under the sole of the cyclist's shoe 74 (FIGS. 2 and 3) is secured the plate 75 of a pedal-stop provided with two lugs 76, 76a, adapted to come into engagement one on each side of the bearing 66 whereas plate 75 comes to bear against the upper part of said bearing 66.

In addition, the front part of plate 75 comes to rest against the front edge 70 of the platform, so that the foot is resting in the center of the pedal on axle 67 and at the front part of edge 70.

FIGS. 4, 5 and 6 show a variant embodiment of the device, which comprises a bearing 77 inside which is pivotally mounted an axle 67, said bearing presenting at its two ends, bores or holes 78, 78a in which are mounted screws for fixing the bearing 77 on the platform 64 in manner adjustable lengthwise.

In its central part, said bearing 77 is quadrangular-shaped, its faces being in contact with faces 79, 79a of lugs 76, 76a and with the lower face of plate 75.

Figures 8, 9:
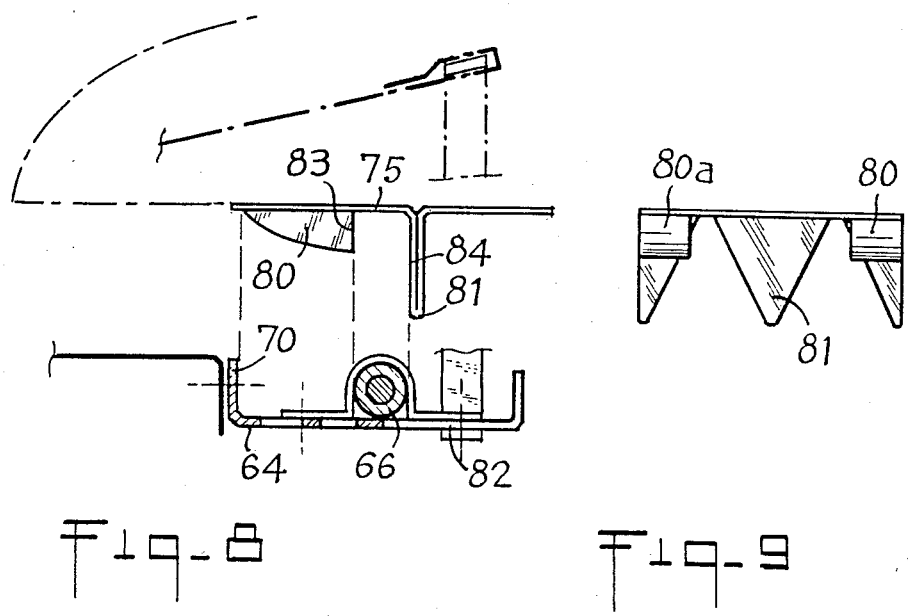
FIG. 8 is an elevational view of a cross-section along line VIII—VIII of FIG. 7.
FIG. 9 is an elevational front view of the pedal-stop.
Figure 7:
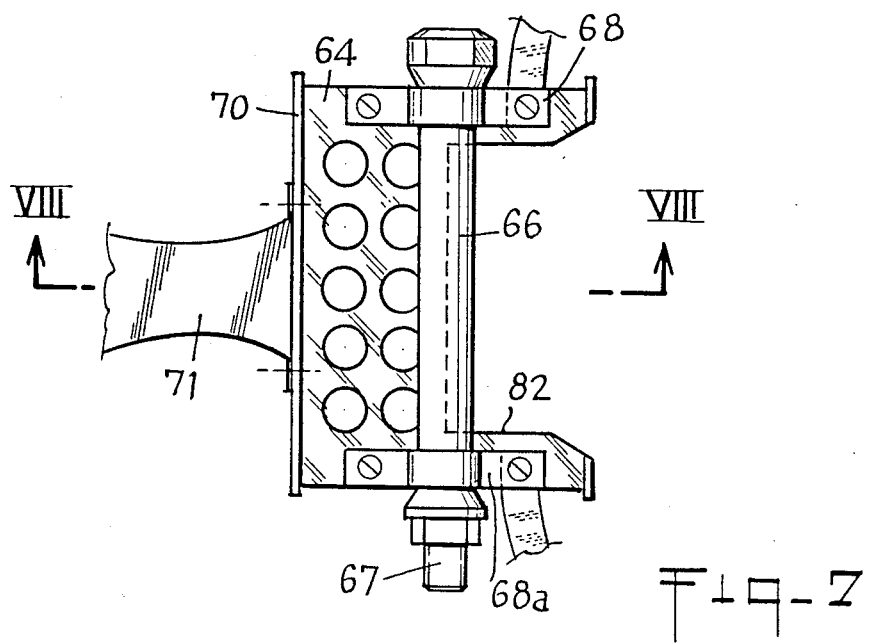
FIG. 7 is a plan view of a pedal provided with an indentation to allow passage of the spikes of the pedal stop.

The pedal illustrated in FIGS. 7, 8 and 9 is identical to that shown in FIGS. 1 and 2, except that the pedal-stop is provided at the front with two lugs 80, 80a fixed on the plate 75 of the pedal-stop, and at the back, said plate is desigend so as to have spikes 81, extending perpendicularly to the platform 64, and engaging in an indentation 82 provided at the back of platform 64.

When plate 75 is resting against bearing 66 and against front edge 70 of the platform, the lugs 80 and 80a are resting by their face 83 against one side of bearing 66, and the spikes 81 by their face 84 against the other side of said bearing.

Spikes 81 are designed for cyclists who practice the cyclo-cross, i.e. who alternately use their cycle and run, and this is when they need the spikes. But it is obviously possible to use any other form of spikes and to associate them to lugs identical to those shown in FIGS. 1 and 2.

Figure 11:
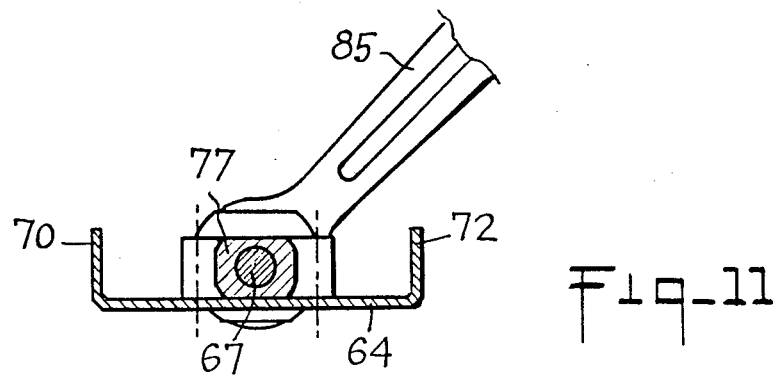
FIG. 11 is an elevational view of a cross-section along line XI—XI of FIG. 10.
Figure 10:
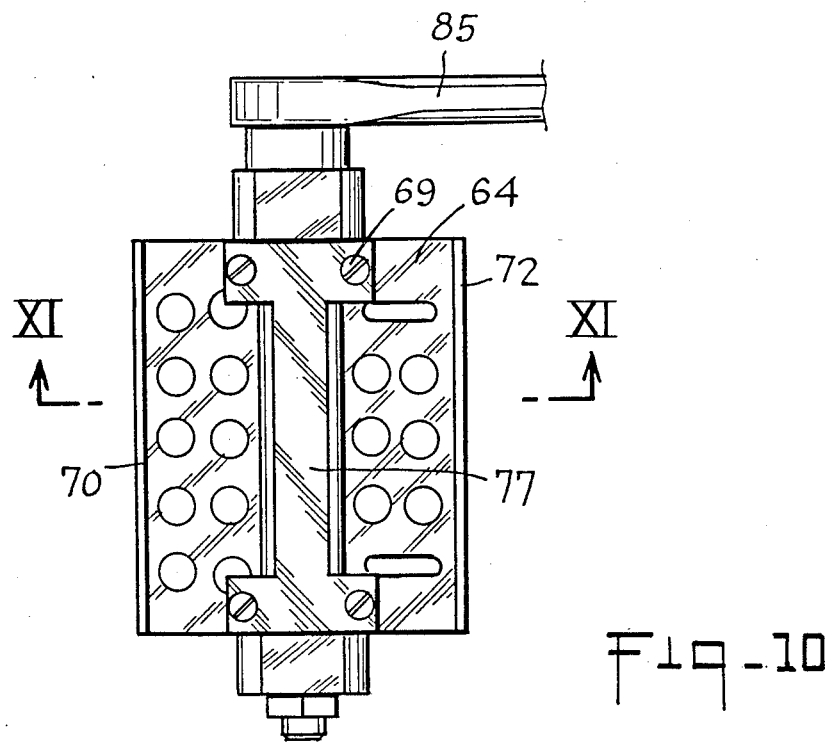
FIG. 10 is a plan view of a balanced pedal returning to a horizontal position.

FIGS. 10 and 11 show another embodiment of the invention in which the pedal is identical to that shown in FIGS. 4, 5, except that the turned-back edge 72 has not indentation 73 and is identical to the turned up front edge 70. As a result, the platform 64 being situated under axle 67 and the assembly being perfectly balanced, the pedal mounted on the crank 85 returns automatically to the horizontal position whatever the position of the crank, this making it easier for the cyclist to lay his foot on the pedal.

Figure 12:
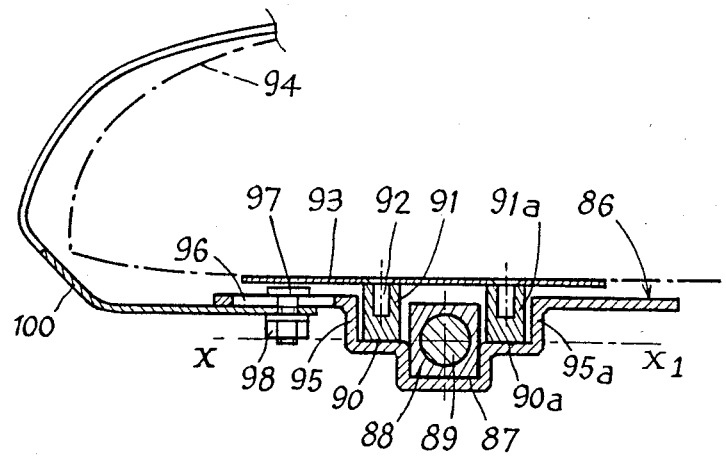
FIG. 12 is an elevational view of a cross-section along line XII—XII of FIG. 13 of an improved pedal according to the invention.
Figure 13:
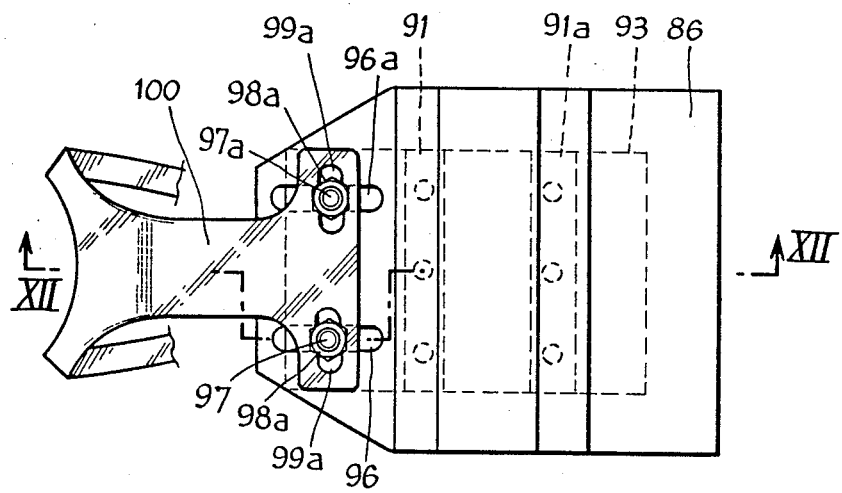
FIG. 13 is a plan view of a pedal according to the invention on which is mounted a toe-clip.

FIGS. 12 and 13 show a pedal according to the invention which comprises a platform 86 provided in its middle part with a groove 87 into which is engaged a bearing 88 receiving an axle 89 mounted for pivoting in said bearing and secured in known manner at one of its ends to a crank, not shown in the drawing.

Bearing 88 is secured by known means on the platform 86 and has two surfaces 90, 90a situated inside a plane XX₁ traversing the center of axle 89 of the pedal. Lugs 91, 91a rest on the surfaces 90, 90a of the platform, which lugs are secured by screws 92 on the plate 93 of a pedal-stop which is fixed to the sole of a shoe 94.

In this way, lugs 91, 91a of the pedal-stop are disposed one on each side of bearing 88, and rest against surfaces 90, 90a of the platform, said surfaces being situated inside a plane traversing the center of axle 89.

Surfaces 90, 90a are extended on both sides by surfaces 95, 95a perpendicular thereto, and against which can abut lugs 91, 91a.

At the front of said platform 86, are provided two oblong holes 96, 96a which are parallel and extend perpendicularly to the pivoting axle of the pedal.

Screws 97, 97a are engaged in holes 96, 96a, said screws being equipped with nuts 98, 98a and being mounted in two oblong holes 99, 99a provided in a toe-clip 100 and extending perpendicularly to oblong holes 96, 96a provided in the platform.

It is possible with this particular arrangement to adjust the position of the toe-clip 100 in two perpendicular directions.

Figure 14:
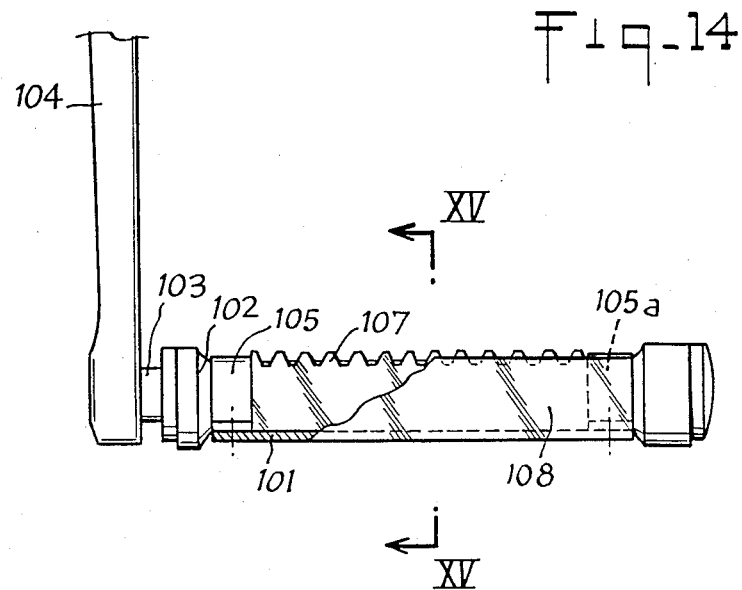
FIG. 14 is a side elevation and partial cross-section of another embodiment of a pedal.
Figure 15:
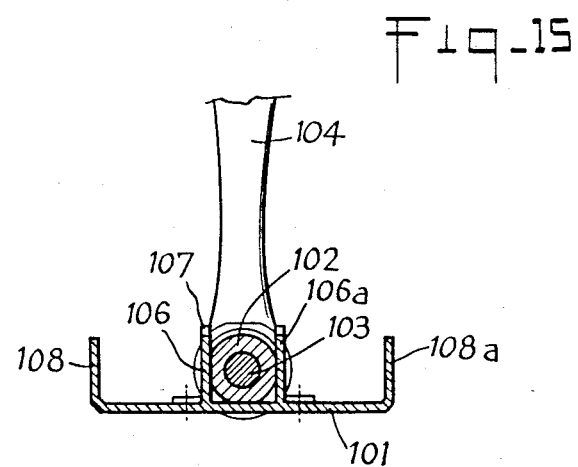
FIG. 15 is a cross-section along line XV—XV of FIG. 14.

FIGS. 14 and 15 illustrate another embodiment of pedal which comprises a platform 101 on whose upper face is secured a bearing 102 inside which a pedal axis is mounted for pivoting, said axle being fixed to the end of the crank 104 of a crank-gear.

Said bearing 102 is mounted on the platform by clamp means 105, 105a secured by screws engaged in tapped holes provided on each side of said platform. On either side of bearing 102, the platform is integral with two parallel walls 106, 106a extending perpendicularly to platform 101, said walls having toothed edges 107 the top of the teeth of which extend on a level higher than the level of bearing 102 and of the two parallel edges 108, 108a of the platform extending perpendicularly thereto. Walls 106, 106a , can also be added on to platform 101 by means of U-piece which is held firmly between bearing 102 and platform 101.

According to the embodiment shown in FIGS. 3 and 4, the cyclist's foot rests on the center part of the pedal, on the toothed edge 107 of walls 106, 106a.

The invention is in no way limited to the description given hereinabove and on the contrary covers any modifications that can be brought thereto without departing from the scope thereof.

What I claim is:

1. A pedal and pedal stop assembly for cycles, comprising:
    a pedal axle having a central axis;
    a bearing on the pedal axle;
    a pedal platform fixedly mounted to the bearing, the platform having a pair of bearing surfaces on opposite sides of the axle, which bearing surfaces lie in a plane common with the pedal axis; and
    a pedal stop having a pair of lugs sized, and spaced apart a distance, so as to fit on either side of the bearing and rest on the respective bearing surfaces.

2. An assembly as defined in claim 1, wherein the pedal platform includes a groove, wherein the axle and bearing are disposed within the groove, and wherein the bearing surfaces extend to either side of the groove.

3. An assembly as defined in claim 1, wherein the pedal platform includes a pair of abutment surfaces, each extending from an outer edge of one of the bearing surfaces, in a direction perpendicular to the plane in which the bearing surfaces lie, so as to form abutments for the lugs of the pedal stop.

4. An assembly as defined in claim 2, wherein the pedal platform includes a pair of abutment surfaces, each extending from an outer edge of one of the bearing surfaces, in a direction perpendicular to the plane in which the bearing surfaces lie, so as to form abutments for the lugs of the pedal stop.

5. An assembly as defined in claim 1, comprising a toe clip having a pair of oblong holes therein for mounting to the pedal platform, wherein the pedal platform has a pair of cooperating oblong holes formed therein, wherein one pair of holes extends perpendicular to the axle axis and the other pair of holes extends parallel to the axle axis, and further comprising means extending through the holes for adjustably securing the toe clip to the pedal platform.

6. An assembly as defined in claim 2, comprising a toe clip having a pair of oblong holes therein for mounting to the pedal platform, wherein the pedal platform has a pair of cooperating oblong holes formed therein, wherein one pair of holes extends perpendicular to the axle axis and the other pair of holes extends parallel to the axle axis, and further comprising means extending through the holes for adjustably securing the toe clip to the pedal platform.

7. An assembly as defined in claim 3, comprising a toe clip having a pair of oblong holes therein for mounting to the pedal platform, wherein the pedal platform has a pair of cooperating oblong holes formed therein, wherein one pair of holes extends perpendicular to the axle axis and the other pair of holes extends parallel to the axle axis, and further comprising means extending through the holes for adjustably securing the toe clip to the pedal platform.

8. An assembly as defined in claim 4, comprising a toe clip having a pair of oblong holes therein for mounting to the pedal platform, wherein the pedal platform has a pair of cooperating oblong holes formed therein, wherein one pair of holes extends perpendicular to the axle axis and the other pair of holes extends parallel to the axle axis, and further comprising means extending through the holes for adjustably securing the toe clip to the pedal platform.

* * * * *